Figure 1:
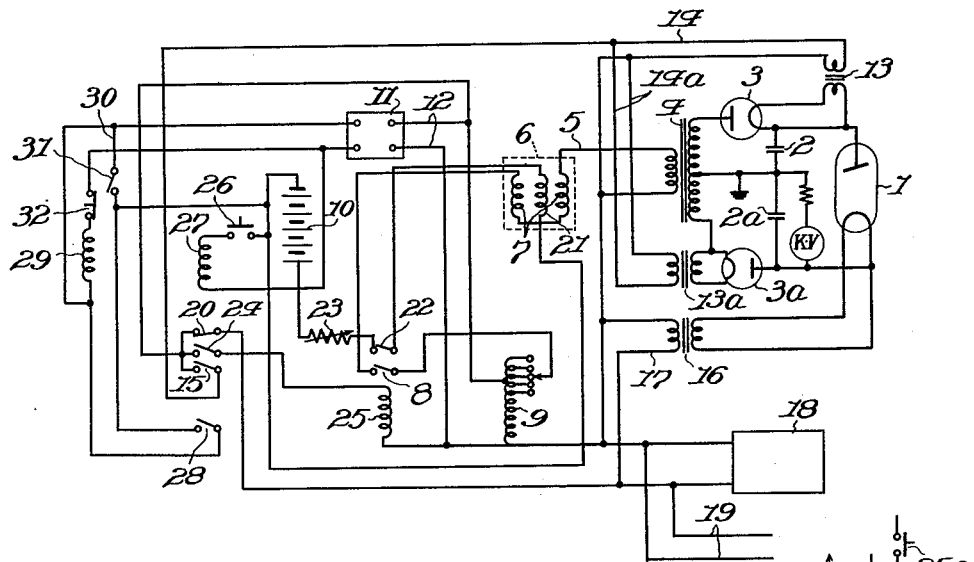

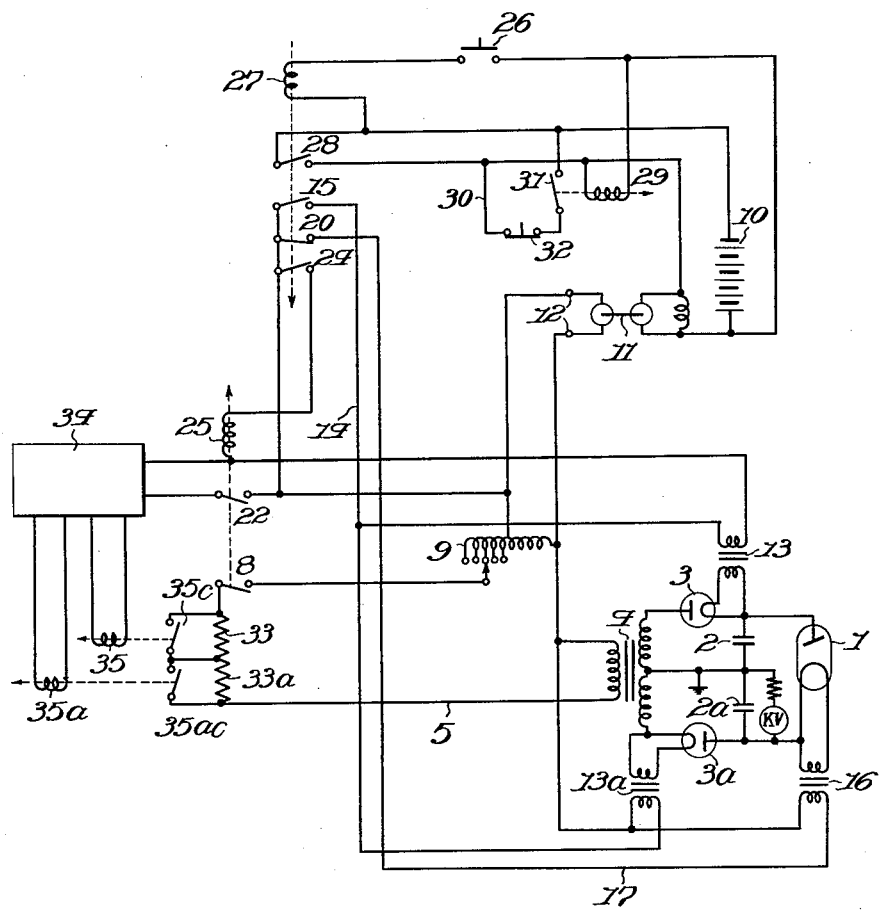

United States Patent Office

3,125,679
Patented Mar. 17, 1964

3,125,679
TRANSPORTABLE X-RAY APPARATUS UTILIZING AN AUTOMOTIVE STORAGE BATTERY AS POWER SOURCE
Ryohei Ohde and Iwao Yamane, Tokyo-to, Japan, assignors to Kabushiki Kaisha Hitachi Seisakusho, Tokyo-to, Japan, a joint-stock company of Japan
Filed Aug. 21, 1961, Ser. No. 132,856
2 Claims. (Cl. 250—98)

This invention relates to techniques in and apparatus for roentgenology, and more particularly it relates to a new, transportable X-ray apparatus which may be operated on an automotive storage battery as the power supply.

It is an object of the present invention to provide a new, conveniently transportable, X-ray apparatus which can be easily loaded on a motor vehicle of small size, readily transported to regions without electric power sources, and conveniently used for X-ray photography.

It is another object of the invention to provide an X-ray apparatus as stated above which is capable of repeated photographic operation in a relatively short time without requiring special power supply equipment such as a generator power unit driven by a gasoline engine.

It is a further object of the invention to provide an X-ray apparatus as stated above which has a relatively small inverter and can be operated in a fully satisfactory manner on electrical power supplied by the storage battery already installed in the motor vehicle without consuming excessive power such as would damage or excessively discharge the said battery.

The foregoing objects have been achieved by the X-ray apparatus of the present invention, in which electric power from an ordinary storage battery installed in a motor vehicle as the electric power source for the electric equipment of the said motor vehicle is passed through an inverter and taken out as an alternating current output, which is then supplied, by means of a circuit switching means, to a high voltage generating circuit for charging condensers and the filament-heating circuits of charging current rectifying tubes inserted in the said high voltage generating circuits and, alternately, to the filament-heating circuit of an X-ray tube inserted in the discharge circuit of the said condensers to charge the said condensers to a high voltage by means of the said high voltage generating circuits; then the electric charge thus stored is discharged through the said X-ray tube to cause the emission of X-rays. Furthermore, variable impedance elements are inserted in the primary circuit of a high-voltage transformer of the high voltage generating circuit for charging the condensers so as to limit the charging current of the condensers, thereby to prevent damage by excessive current to the power source and circuits.

The aforesaid variable impedance is composed of a resistance and a reactance and is adapted, through a suitable measure, to lower its impedance value progressively together with the progress of charging in such a manner that the charging is completed in the shortest possible time within the range permitted by the capacity of the power source.

Figure 3:
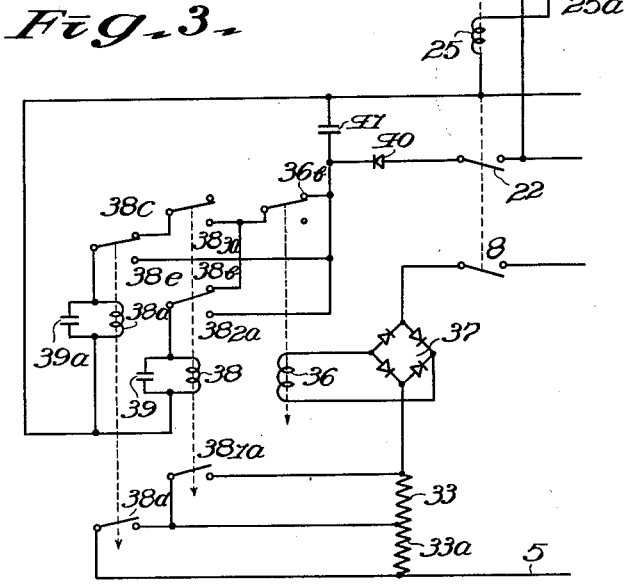
Figure 4:
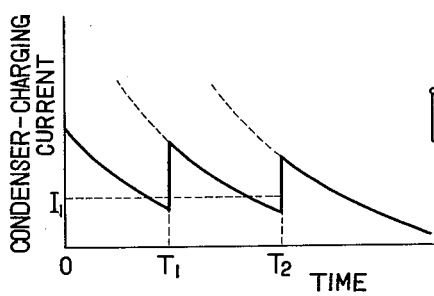

The details of the present invention, as well as the manner in which the objects of the invention may best be achieved, will be more clearly apparent by reference to the following description taken in conjunction with the accompanying illustrations in which the same and equivalent parts are designated by the same reference numerals and letter, and in which:

FIGS. 1, 2, and 3 are electrical connection diagrams showing embodiments of the X-ray apparatus according to the present invention; and FIG. 4 is a graphical representation showing the relation between the condenser-charging current and time.

Referring first to FIG. 1, the terminals of condensers 2 and $2_a$ connected between the plate and cathode of an X-ray tube 1 are connected to the secondary side of a high-voltage transformer 4 by way of rectifying tubes 3 and $3_a$. The primary circuit 5 of the said high-voltage transformer 4 is connected, by way of alternating-current load winding 7 of a saturable reactor 6, a contact 8, and an autotransformer 9, to output terminals 12 of an inverter 11 (for example: a rotary converter) which has a storage battery 10 as its power source, and the plate voltage to be supplied to the X-ray tube 1 is adjusted by switching tapes of the autotransformer 9. For each of the rectifying tubes 3 and $3_a$, a high-voltage rectifying tube, such as a kenotron is used. The primary circuits 14 and $14_a$ of heating transformers 13 and $13_a$ supplying heating current to the filaments of the said rectifying tubes 3 and $3_a$ is connected, by way of a contact 15, to the inverter output terminals 12. The primary circuit 17 of a heating transformer 16 supplying heating current to the filament of the X-ray tube 1 is connected, by way of a contact 20, together with a fan 18 for cooling the X-ray tube 1 and a power supply circuit 19 necessary for an X-ray radiation signal and stop signal, etc., to the inverter output terminals 12. A direct-current control winding 21 of the saturable reactor 6 is connected, by way of a contact 22 and a variable resistance 23, between the two terminals of the storage battery 10, the exciting current of the said direct-current control winding 21 being adjusted by means of the variable resistance 23. The contact 22 inserted in the direct-current control circuit of the saturable reactor 6 and the contact 8 inserted in the primary circuit 5 of the high-voltage transformer 4 are actuated by a coil 25 which is connected, in series with a contact 24, to the inverter output terminals 12, and both said contacts are normally open. Furthermore, the contact 15 inserted in the filament-heating circuit 14 for the rectifying tubes 3 and $3_a$, the contact 20 inserted in the filament-heating circuit 17 for the X-ray tube 1, and the contact 24 inserted in the circuit of the aforesaid coil 25 are actuated by a coil 27 which is connected, in series with a starting contact 26, between the terminals of the storage battery 10, the contact 20 being normally closed, and the contacts 15 and 24 being normally open. A normally open contact 28 which operates in unison with the said contacts 15, 20, and 24 is inserted between the storage battery 10 and the inverter 11. A coil 29 is connected between this contact 28 and the storage battery 10 to open and close a contact 31 in a holding circuit 31 which is parallel with the contact 28.

The storage battery 10, in the case of its normal installation in a motor vehicle, is charged by a charging generator (not shown) directly coupled in a known manner to the engine of the motor vehicle and is used also as a power source for such electrical equipment of the motor vehicle as an engine starting motor, spark plugs, and illuminating lamps.

The embodiment of the present invention indicated in FIG. 1, of the construction described above, has the following operation. When the starting contact 26 is closed, the coil 27 is excited by the current from the storage battery 10 which has been charged beforehand, thereby opening the contact 20 and closing the contacts 15, 24, and 28.

Accordingly, the inverter 11 is connected to the storage battery 10 by the contact 28, and an alternating-current voltage of 100 volts is impressed on the output terminals 12. This voltage causes excitation of the coil 25 by way of the contact 24 to close the contacts 8 and 22, thereby connecting the alternating-current load windings 7 of the saturable reactor 6 to the inverter 11 and the direct-current control winding 21 to the storage battery 10. Consequently, since primary voltage is supplied to the high-voltage transformer 4, and the filaments of the rectifying tubes 3 and $3_a$, at the same time, are heated by the alternating current supplied from the inverter 11, through the contact 15, to the heating transformers 13 and $13_a$, the secondary voltage of the high-voltage transformer 4 is rectified by the rectifying tubes 3 and $3_a$ and charge the condensers 2 and $2_a$.

Since the saturable reactor 6 is inserted in the primary circuit of the high-voltage transformer 4, if the exciting current of the direct-current control winding 21 is regulated by means of the variable resistance 23 so that the impedance of the said reactor 6 is high at the beginning of charging and decreases in accordance with the progress of the charging, the excessive current at the beginning of charging will be controlled, whereby damage to the power supply and the circuits due to this excessive current will be prevented, and it will be possible to make the inverter 11 and high-voltage transformer 4 small in size and light in weight.

When the starting contact 26 is opened after the condensers 2 and $2_a$ have been charged to the desired voltage, the coil 27 is deenergized, the contact 20 closes, and the contacts 15, 24, and 28 are opened. Accordingly, both the aforesaid high voltage generating circuit and the filament-heating circuits of the rectifying tubes 3 and $3_a$, which are caused to operate by the closing of the contacts 15 and 24, are broken. However, since the coil 29 is self-held by the contact 31, the inverter 11 is connected through the holding circuit 30 to the storage battery 10 to continue the operation. When the X-ray tube filament is heated to the electron emission temperature by the alternating-current voltage supplied through the contact 20 to the heating transformer 16, the electric charge which has been stored in the condensers 2 and $2_a$ is discharged through the X-ray tube 1 and generates X-rays.

When the starting contact 26 is closed after emission of X-rays, the filament-heating circuit 17 of the X-ray tube is broken by the excitation of the coil 27, as afore-described, and the primary circuit 5 of the high-voltage transformer 1 and the filament-heating circuit 14 of the rectifying tubes are connected to the inverter 11. Consequently, the condensers 2 and $2_a$ are recharged, and it is possible to operate the X-ray tube 1 with the resulting stored electric charge and thereby to carry out repeated photography.

Upon completion of photography, by opening the contact 32, the coil 29 is deenergized, and the entire apparatus is returned to its original state.

Another embodiment of the present invention is shown in FIG. 2. In this apparatus, resistances 33 and $33_a$ are used as variable impedance elements for limiting the charging current of the condensers, the method adopted being such that these resistances 33 and $33_a$ are successively short-circuited by two sets of relays 35 and $35_a$ which are controlled by a timer 34.

The operation of this apparatus illustrated in FIG. 2 is described below. When the starting contact 26 is closed, the coil 27 is excited by the storage battery 10, whereby the contact 20 is opened, and the contacts 15, 24, and 28 are closed. Since the inverter 11 is then connected by the contact 28 to the battery 10 and starts its operation, its alternating-current output, flowing through the contact 24, excites the coil 25 and causes the contacts 8 and 22 to be closed. The closing of the contact 8 causes primary voltage to be supplied through the resistances 33 and $33_a$ to the high-voltage transformer 4. At the same time, the closing of the contact 15 causes heating current to be supplied to the rectifying tubes 3 and $3_a$, and the charging of the condensers 2 and $2_a$ is started.

The timer 34 consists of two sets of thyratrons to which are imparted a voltage in a direction such as to cancel the negative bias voltage which has been applied beforehand on each grid through, for example, a C-R time constant circuit. Simultaneously with the commencement of charging of the condensers 2 and $2_a$, the timer 34 is connected by the contact 22 to an alternating-current power source and starts its operation. Then, after a certain time interval, when the charging current for the condensers 2 and $2_a$ has been reduced, the first thyratron of the timer 34, operates and actuates the relay 35 connected to its plate circuit, thereby closing the contact $35_c$ and short-circuiting the resistance 33. Then, after a further time interval, when the charging current for the condensers 2 and $2_a$ have been reduced again, the second thyratron operates and actuates the relay $35_a$ connected to its plate circuit, thereby closing the contact $35_{ac}$ and short-circuiting the resistance $33_a$. Thus, all resistances are removed from the charging circuit.

The variation in the condenser charging current during the above-described operation is indicated in FIG. 4, in which $T_1$ and $T_2$ designate the time instants at which the relays 35 and $35_a$ are actuated. As is apparent from this representation, by successively short-circuiting the resistances 33 and $33_a$ with the elapse of time from the instant of starting of charging, excessive current during the initial stage of charging is restricted, and, moreover, it is possible to complete the charging of the condensers in a relatively short time.

When the starting contact 26 is opened after the condensers have been charged in the above-described manner, the coil 27 becomes deenergized, the contact 20 closes, and the contacts 15, 24, and 28 are opened, whereby the primary circuit 5 of the high-voltage transformer and the filament-heating circuit 14 for the rectifying tubes are broken. At the same time, the filament-heating circuit 17 for the X-ray tube is connected to the inverter 11, and the X-ray tube 1 is caused to be operated by the stored electric charge of the condensers 2 and $2_a$ in the same manner as in the apparatus shown in FIG. 1. Furthermore, the opening of the contact 22 causes the timer 34 and the relays 35 and $35_a$ to return to their respective original states in preparation for the succeeding charging operation.

An embodiment of the invention wherein, instead of the timer 34 shown in FIG. 2, a current relay is used, and relays for short-circuiting resistances are caused to be actuated successively as indicated in FIG. 3, wherein a current relay 36 is inserted in series connection with resistances 33 and $33_a$, by way of a full-wave rectifier 37, in the primary circuit 5 of the high-voltage transformer. When the charging current flowing through this circuit is reduced below a certain value, this current relay 36 closes its contact $36_b$.

Condensers 40 and 41 are connected in parallel to resistance short-circuiting relays 38 and 39 in order to produce delays in their actions. In order to actuate these relays, a direct-current power source consisting of a rectifier 42 and a condenser 43 is provided.

When the coil 25 is excited by the closing of the starting contact $25_a$, the contacts 8 and 22 are closed, and the rectifier 42 is connected, together with such the primary circuit 5 of the high-voltage transformer, to such the inverter as illustrated in FIG. 2. However, since the current relay 36 operates to open the contact $36_b$ simultaneously with the start of flow of the charging current through the resistances 33 and $33_a$ to the said primary circuit 5 of the high-voltage transformer, the relays 38 and 39 are prevented from reaching their operative condition by the delaying action of the condensers 40 and 41.

After a while, when the charging current has decreased to a certain value ($I_1$ in FIG. 4), the current relay 36 is released and closes its contact $36_b$. Accordingly, current flow from the rectifier 42 through the contacts $36_b$ and $38_b$ to charge the condenser 40. After a certain time delay, at a time instant $T_1$, the relay 38 operates to open the contact $38_b$, at the same time closing contacts $38_{1a}$, $38_{2a}$, and $38_{3a}$ and short-circuiting the resistance 33. As indicated in FIG. 4, the charging current of such condensers 2 and $2_a$ as illustrated in FIG. 2 is caused by the short-circuiting of the resistance 33 to increase again. In accordance with this increase of the said charging current, the current relay 36 operates and opens the contact $36_b$, but the relay 38, through its contact $38_{2a}$, is self-held.

Then, when the charging current has decreased to a certain value $I_1$, the current relay 36 is again released and closes the contact $36_b$, and current flows from the rectifier 42 through the contacts $36_b$, $38_{3a}$, and $39_b$ to charge the condenser 41. Accordingly, after a certain time delay, at a time instant $T_2$, the relay 39 operates to open the contact $39_b$, simultaneously closing contacts $39_{1a}$ and $39_{2a}$ and short-circuiting the resistance $33_a$, but, at the same time, being self-held by the contact $39_{2a}$. Thus, all resistances are removed from the circuit. Since the other features of the circuit composition of the embodiment of FIG. 3 are the same as those of the apparatuses shown in FIGS. 1 and 2, diagrammatic illustration and description thereof are omitted herein.

While examples of the embodiments wherein resistances are used as impedance elements for limiting the charging current have been described in connection with FIGS. 2 and 3, reactors may be used for this purpose. Various other measures are conceivable for limiting the charging current. For example: Use may be made of a variable resistance or reactor having a sliding brush which is driven by an electric motor connected to its power source simultaneously with the start of charging, and the value of the impedance introduced into the condenser charging circuit is varied continuously from maximum to minimum in accordance with the progress of the charging.

Since it is obvious that many changes and modifications can be made in the above-described details without departing from the nature and spirit of the invention, it is to be understood that the invention is not to be limited to the details described herein except as set forth in the appended claims.

What is claimed is:

1. In a transportable X-ray apparatus operatable on a storage battery as its power source, the improved combination comprising an inverter connected to the storage battery for converting a direct current into an alternating current, a transformer having its primary connected to the inverter output for boosting the output alternating voltage of said inverter, capacitive means for storing a high voltage electric charge, an electric circuit for connecting said capacitive means to the secondary side of said high voltage transformer, heated filament rectifying tube means inserted in said electric circuit for supplying charging current into said capacitive means, a filament-heating circuit for said rectifying tube means, an X-ray tube in the discharge path of the capacitive means, a filament-heating circuit for said X-ray tube, a circuit-switching means for alternately supplying the alternating-current output of said inverter to the primary circuit of said high voltage transformer and the filament-heating circuit of said rectifying tube means and to said filament-heating circuit of said X-ray tube, thereby causing the charging of said capacitive and the emission of X-rays due to the discharging of said capacitive means through the X-ray tube to take place alternately, an electrical impedance in the primary circuit of said high voltage transformer for limiting the initial charging current for the capacitive means flowing in said primary circuit, and means for decreasing the impedance value of said variable impedance element during the charging of the capacitive means.

2. In a transportable X-ray apparatus operatable on a storage battery as its power source, the improved combination comprising an inverter connected to the storage battery for converting a direct current into an alternating current, a transformer having its primary connected to the inverter output for boosting the output alternating voltage of said inverter, condensers for storing a high voltage electric charge, electric circuits for connecting said condensers to the secondary side of said high voltage transformer, rectifying tubes having heater filaments inserted in said electric circuits for supplying charging current into said condensers, filament-heating circuits for said rectifying tubes, an X-ray tube in the discharge path of the condensers, a filament-heating circuit for said X-ray tube, circuit-switching means alternately supplying the alternating-current output of said inverter to the primary of said high voltage transformer and the filament-heating circuits of said rectifying tubes and to said filament-heating circuit of said X-ray tube, thereby causing the charging of said condensers and the emission of X-rays due to the discharging of said condensers to take place alternately, an electrical impedance in the primary circuit of said high voltage transformer for limiting the initial condenser-charging current flowing in said primary circuit, and means for decreasing the impedance value of said variable impedance element during charging of the condensers.

References Cited in the file of this patent

UNITED STATES PATENTS

| 2,018,483 | Brewer | Oct. 22, 1935 |
| 2,129,383 | Ulrey | Sept. 6, 1938 |
| 2,894,194 | Flood | July 7, 1959 |

FOREIGN PATENTS

| 293,376 | Great Britain | July 5, 1928 |